May 16, 1950  C. J. HULL  2,507,976
CONTROL MEANS FOR HOME MOVING PICTURE APPARATUS
Filed Sept. 20, 1944
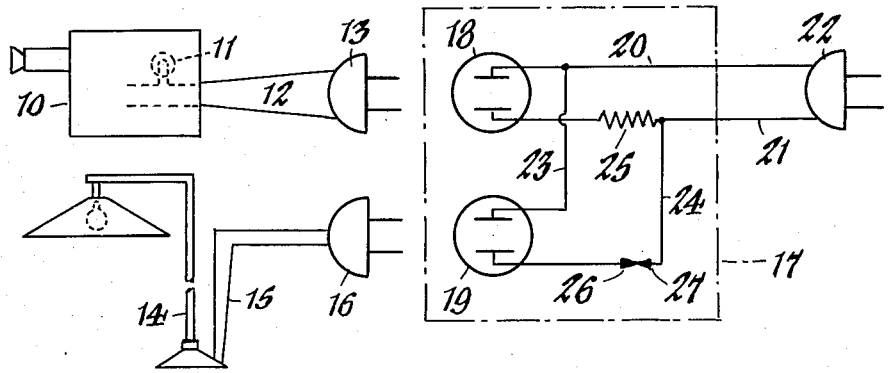
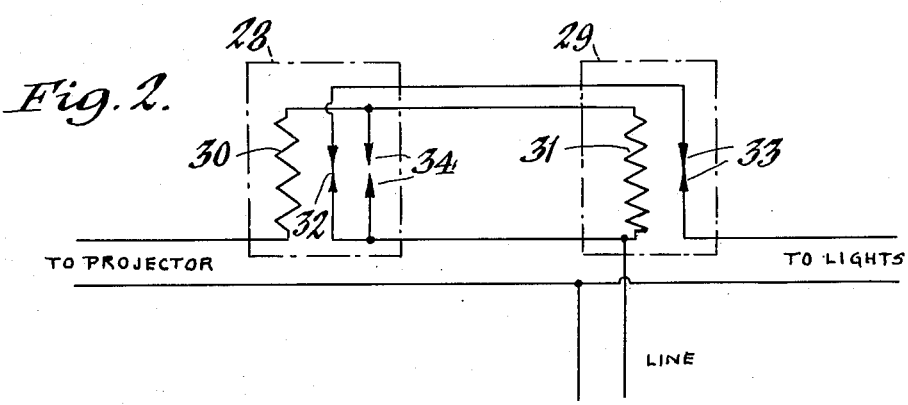
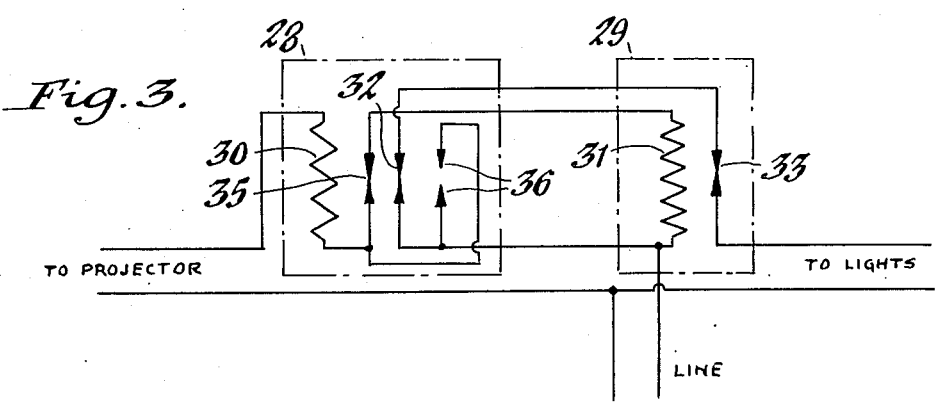
Inventor,
Charles J. Hull,
by Walter P. Guyer
Attorney.

Patented May 16, 1950

2,507,976

UNITED STATES PATENT OFFICE 2,507,976

CONTROL MEANS FOR HOME MOVING PICTURE APPARATUS

Charles J. Hull, Kenmore, N. Y.

Application September 20, 1944, Serial No. 554,936

1 Claim. (Cl. 315—322)

This invention relates to certain new and useful improvements in control means or devices designed primarily for use with moving picture projecting apparatus of the home or domestic type.

One of its objects is to provide a control device of this character which is so designed and constructed as to automatically switch off any room illumination included in the circuit of the device at such time as the projector-lamp is lighted and the projector otherwise is ready for operation, and to automatically switch the room illumination on when the projector-lamp is turned out, as when rewinding the film after it has been projected.

Another object of the invention is to provide an electrically governed device for use with motion picture projectors which will automatically control the room illumination as determined by the operating condition of the projector.

A further object is to provide a motion picture projector control for room illumination purposes which is simple, compact and inexpensive in construction, which is reliable in operation, and which may be built directly into the projector or as auxiliary equipment which may be readily connected to projectors now in use.

In the accompanying drawings:

Figure 1 is a diagrammatic view of the control means and electrical circuit thereof embodying my invention. Figures 2 and 3 are similar views showing modified forms of the invention.

Similar characters of reference indicate corresponding parts throughout the several views.

Referring to the embodiment of my invention shown in Figure 1, 10 indicates a motor-driven motion picture projector of the domestic type having an electric lamp 11 arranged therein and having the usual wire or line cord 12 and plug 13 leading therefrom and in the circuit of which the projector-motor and lamp are connected. As an example of a form of illumination employed in the room in which the projector is used, and which it is desired to switch off during the projection of the film on the screen and switch on again after the showing of the film, I have shown a floor lamp 14 having the usual wire or line cord 15 and plug 16 leading therefrom.

For the purpose of automatically controlling the room illumination during the operation of the projector, I provide an electric control device which is indicated generally by the numeral 17 and which may be built into the projector or may be made as a separate item of equipment as shown. It consists of two terminal sockets 18, 19 companion to and adapted to receive the projector and lamp plugs 13 and 16, respectively. The terminals of the socket 18, to which the projector is directly coupled by the plug 13 are connected by wires 20, 21 to the domestic line current through the medium of a wall plug 22 while the terminals of the companion socket 19 are connected through a branch or auxiliary circuit by wires 23, 24 with said line wires 20, 21, respectively, so that normally when this circuit is closed at the plugs 13, 16 and 22, both the projector and the floor lamp are rendered operative.

Included in series with the projector circuit 20, 21 is a relay coil 25 of low resistance for controlling a pair of relay contacts 26, 27 included in the circuit of the floor lamp 14 for controlling the illumination of the room as determined by the operating condition of the projector. The relay coil is of a capacity or made of wire of sufficient size to carry the load of the projector lamp continuously and is further so characterized that the current required for running the projector motor alone or apart from the projector lamp 11 will not energize or operate the relay. Hence under such conditions, or at such times as the projector lamp is out, the relay contacts are closed and the room illumination, in this instance the floor lamp 14, remains on so that the operator of the projector has light to observe the film rewinding operation or that of installing a new film reel in the machine. However, when both the projector motor and its lamp are operatively included in the circuit, then the relay is immediately energized or rendered operative to open the relay contacts and break the circuit 23, 24 including the floor lamp 14 to thereby automatically extinguish the room illumination during the projection of the film on the screen. When the showing of the film is completed and the projector-lamp 11 is switched off, then the relay contacts are again closed to automatically light the lamp 14, enabling the operator to readily adjust the film for rewinding. During the rewinding operation, the room illumination remains on because the current required for running the projector motor will not energize the relay coil.

In the modified forms of the invention shown in Figures 2 and 3, two relays, indicated generally at 28, 29, are included in series in the control circuit to broaden its range of operation, one coil being of lower resistance and having fewer turns than the other. In these figures, the low resistance coil is indicated at 30 and the high resistance coil at 31 and each coil has contacts 32 and 33 in operative relation thereto for controlling the room illumination. In the circuit of Figure 2, contacts 34 are provided for shorting out the coil 31 of relay 29 when the armature of the low resistance relay 28 is in its attracted position, while in the circuit of Figure 3, under like conditions, contacts 35 are provided for effecting the actual opening of that branch of the circuit including such coil. The relay 28 shown in Figure 3 is also provided with a pair of holding contacts 36. The coil 31 of each relay 29, in both modifications, will be energized to attract at a current reading sufficiently high to prevent the projector motor from operating the relay but at a point low enough to allow the relay to operate when the device is used with the small 100 watt projector lamp. Furthermore, this relay will operate without overheating up to a current where the armature of the companion low resistance relay 28 will attract. By the use of these circuits, the operating range is extended so that the device will operate from a low current where the high resistance relay will first operate up to a high current where the low resistance relay starts to overheat.

While this invention has been designed primarily for use with moving picture projectors, it is equally applicable to still or stereoptican projectors and similar apparatus.

I claim as my invention:

A compact switch unit for use with a motion picture projecting machine including an operating motor, a projector lamp and separate manually operable control switches therefor and a source of room illumination, said unit having means for detachably connecting the same in circuit with a conventional electrical convenience outlet, a casing enclosing said unit and having separate electrical outlets one of which receives the conductor from the motion picture projector and the other receives the conductor for the source of room illumination, circuit making contacts in said unit through which current normally flows from the convenience outlet to both the operating motor of the projection machine when its control switch is actuated and to the source of room illumination, additional contact means in said unit responsive to an increased flow of current through the outlet receiving the projector conductor when the control switch for the projector lamp is actuated for interrupting the flow of current through the conductor for the surce of room illumination.

CHARLES J. HULL.

REFERENCES CITED

The following references are of record in the file of this patent:

UNITED STATES PATENTS

| Number | Name | Date |
|---|---|---|
| 1,173,239 | Ziegler | Feb. 29, 1916 |
| 1,592,322 | Adams | July 13, 1926 |
| 1,669,784 | Scofield | May 15, 1928 |
| 1,728,005 | Ohlgart | Sept. 10, 1929 |
| 1,946,570 | Beidler | Feb. 13, 1934 |